May 20, 1969  D. K. WAKEFIELD  3,444,723
FLUID DENSITY METERS

Filed Dec. 20, 1966  Sheet 1 of 5

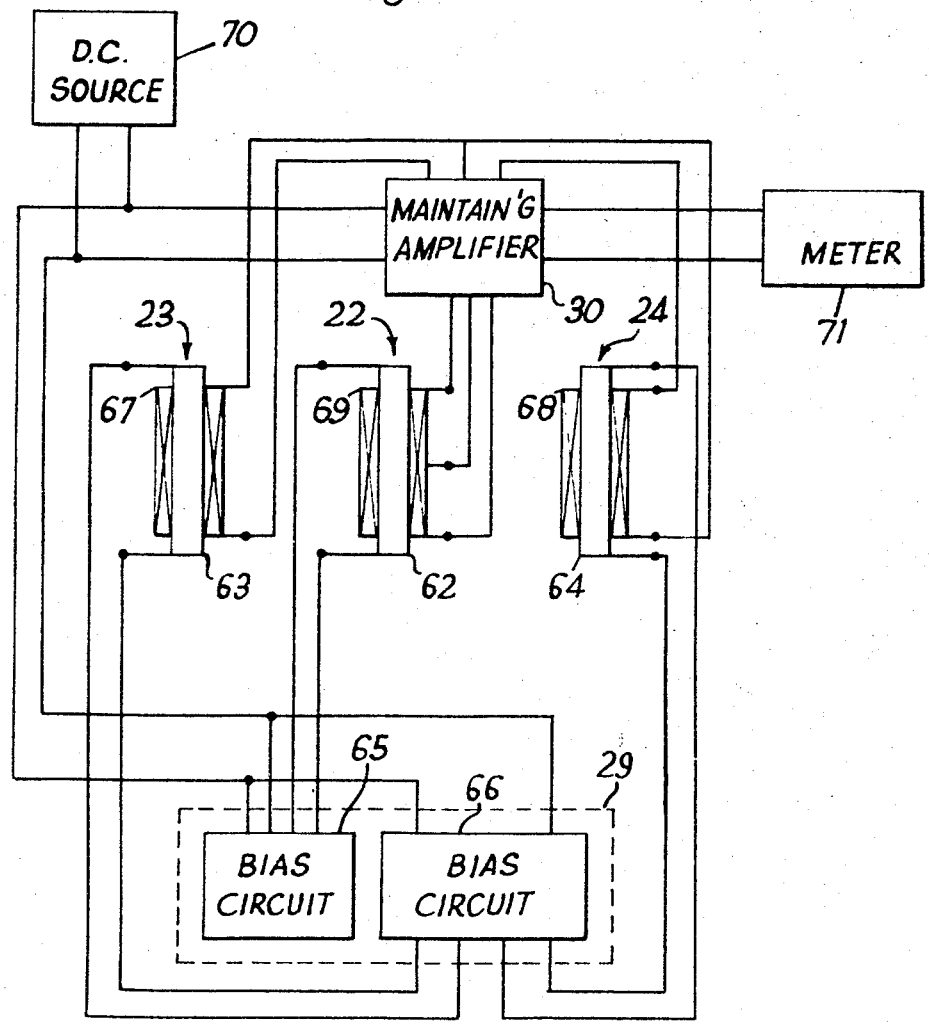

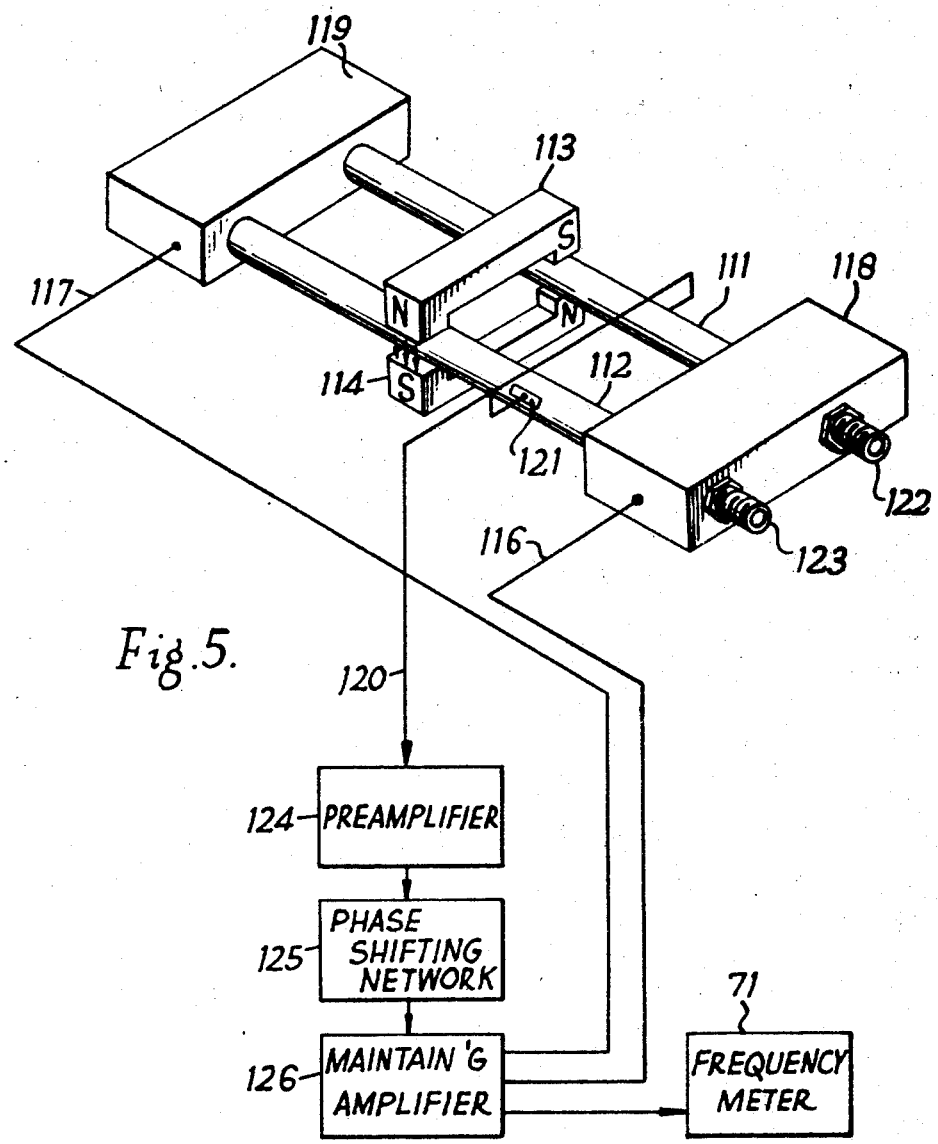

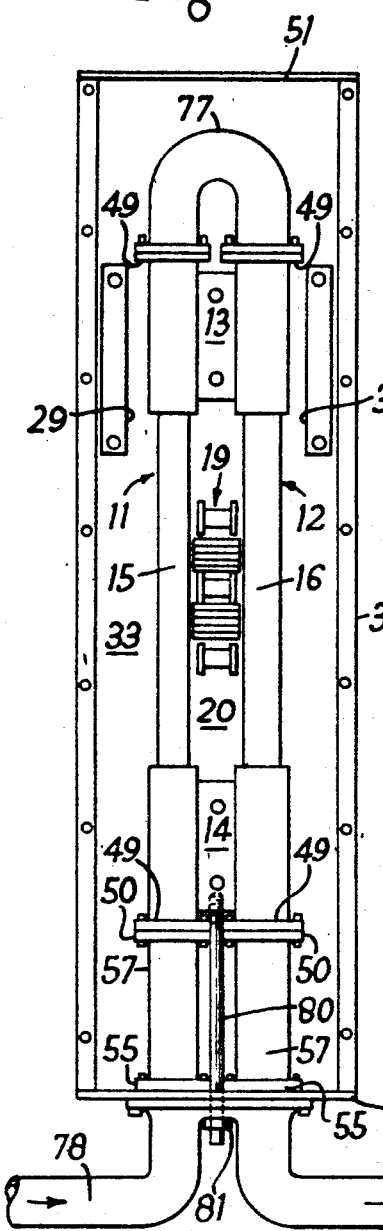
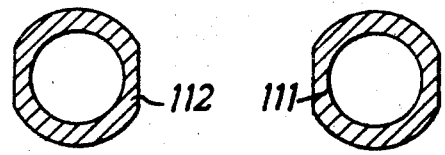
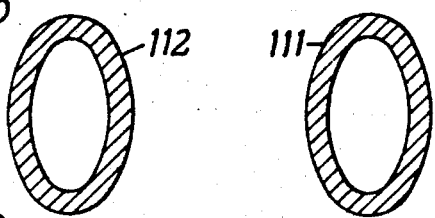
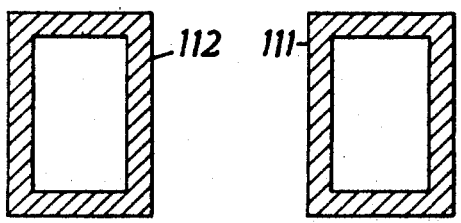

3,444,723
FLUID DENSITY METERS
Donald Keith Wakefield, Farnborough, England, assignor to The Solartron Electronic Group Ltd., Farnborough, Hampshire, England, a corporation of the United Kingdom
Filed Dec. 20, 1966, Ser. No. 603,329
Claims priority, application Great Britain, Dec. 29, 1965, 55,112/65
Int. Cl. G01n 9/00
U.S. Cl. 73—32                     21 Claims

ABSTRACT OF THE DISCLOSURE

A continuous-flow liquid densitometer having two parallel tubes secured together at their ends. Natural transverse vibrations of respective matched central portions of the tubes are electrically maintained in anti-phase and the density of a liquid flowing through the tubes is determined by the frequency of the signals in the electric maintaining means.

---

This invention relates to fluid density meters.

Fluid density meters which, in operation, maintain bodily vibration of a mass of fluid in order to determine the density of the fluid are known. Examples of such density meters are described in British patent specification No. 786,113 and United States patent specification No. 2,635,462.

According to the present invention a fluid density meter comprises two tubes formed of the same resilient material and having uniform unobstructed bores and respective central portions of identical dimensions, each end portion of each tube being secured to a respective end portion of the other tube in such a manner that the central portions are spaced apart from one another, inlet and outlet ports being provided so that fluid can be passed through the bores of the tubes, means for exciting respective natural transverse vibrations of the central portions in anti-phase when the tubes are full of a fluid, and means for providing a signal representative of the frequency of the said vibrations.

The present invention will now be further described by way of example with reference to the accompanying drawings in which.

Figure 1:
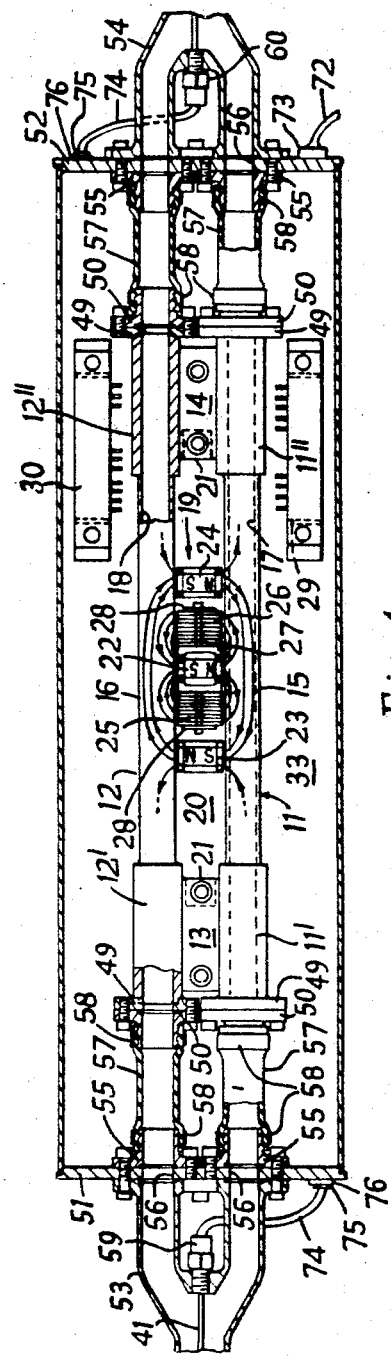
FIG. 1 is a plan view of an embodiment of the invention.

FIG. 4 is a block diagram of vibration maintaining and frequency measuring circuitry of the embodiment of FIG. 1, FIG. 5 is a simplified view of another embodiment of the present invention, FIG. 6, FIG. 7 and FIG. 8 are cross-sectional views of the central portions of the tubes of three further embodiments of the present invention, and FIG. 9 is a plan view of yet further embodiments of the present invention.

Referring to FIG. 1, there is shown a liquid density meter for measuring the density of a liquid. The density meter includes two tubes 11 and 12 through which the liquid is passed in operation. The tubes 11 and 12 are the same shape and size and are disposed in the manner of opposite sides of a rectangle. A first web 13 is welded to one pair of immediately adjacent end portions 11' and 12' of the tubes 11 and 12, a second web 14 being welded to the other pair of immediately adjacent end portions 11" and 12" of the tubes 11 and 12. The webs are of identical size and shape and serve to space apart and secure to one another immediately adjacent end portions of the tubes 11 and 12.

The tubes 11 and 12 and the webs 13 and 14 are formed of a resilient ferromagnetic metal, for example Ni-Span-C 902 (registered trademark) or Elinvar.

The end portions 11', 11", 12' and 12" are cylindrical and of equal length, the central portions 15 and 16 of the tubes 11 and 12 also being cylindrical. Uniform unobstructed bores 17 and 18 are formed in the tubes 11 and 12 respectively. It will be seen that the external diameters of the end portions of the tubes are larger than the external diameters of the central portions 15 and 16.

The central portions 15 and 16 are spaced apart so that they may vibrate transversely in anti-phase, and, in the present embodiment, to allow an electromagnetic drive-and-pick-up coil assembly 19 to be mounted therebetween. The assembly 19 is mounted on a rectangular metal platform 20 which in turn is mounted on the webs 13 and 14 by resilient metal brackets 21. The assembly 19 includes a drive coil 22 the axis of which passes through the midpoints of the tubes 11 and 12, the other elements of the assembly 19 being arranged symmetrically about the axis of the drive coil 22.

Thermal expansion of the platform 20 parallel to the tubes 11 and 12 is accommodated by the brackets 21, which also reduce the transmission of vibration from the webs 13 and 14 to the assembly 19.

Two pick-up coils 23 and 24 are so arranged that their axes are parallel to the axis of the drive coil 22, the axes of the tubes 11 and 12, the drive coil 22, and the pick-up coils 23 and 24 lying in a common plane. A pair of magnetic shunts 25 and 26 are bolted on to opposite sides of a metal frame 27 in which the drive coil 22 is located. Each of the shunts 25 and 26 comprises a plurality of plates clamped together between a respective washer 28 and a side of the frame 27.

The drive coil 22 and the pick-up coils 23 and 24 are each provided with a respective biasing winding over which is wound a drive or pick-up winding as the case may be. Direct currents are passed through the biasing windings in operation in such directions that the drive and pick-up coils acquire the polarities indicated by the positions of the letters N and S in FIG. 1, the letter N indicating a north-seeking magnetic pole and a letter S indicating a south-seeking magnetic pole. The steady biasing magnetic fields set up thereby are indicated schematically by lines of force in FIG. 1. Direct current is supplied to the biasing windings from a bias current drive 29. The pick-up windings of the pickup coils 23 and 24 are coupled through a maintaining amplifier 30 to the drive winding of the drive coil 22. (For clarity, leads between the coils 22, 23 and 24 and the bias current drive 29 and the maintaining amplifier 30 have been omitted from FIG. 1, FIG. 2 and FIG. 3.)

Figure 2:
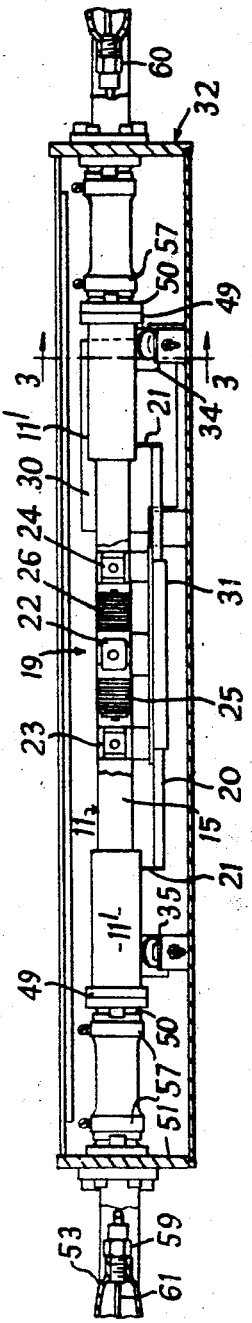
FIG. 2 is a side elevation of the embodiment of FIG. 1 partially broken away.

Referring now to FIG. 2, part of the central portion 15 is broken away to show details of the assembly 19.

Leads (not shown) from the bias current drive 29 and the maintaining amplifier 30 are conected to appropriate tags on a tag board 31 secured to the platform 20.

Figure 3:
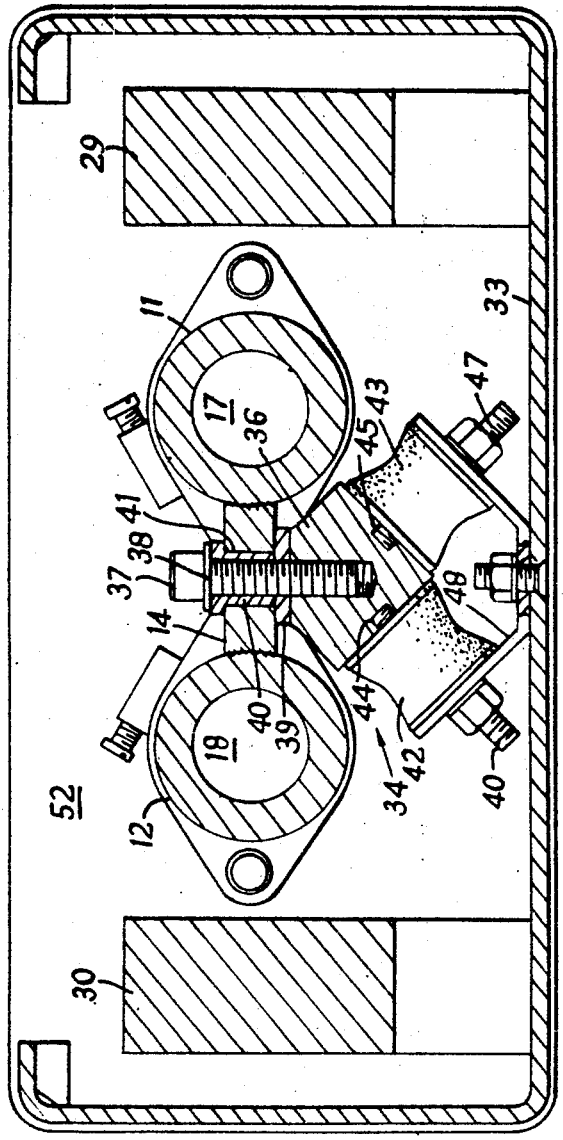
FIG. 3 is a transverse section taken at the line 3—3' in FIG. 2.

The tubes 11 and 12 are mounted on a wall 33 of a housing 32 by means of two anti-vibration mountings 34 and 35. Referring to FIG. 3, the mounting 34 includes a metal block 36 to which the web 14 is clamped by means of a bolt 37 which passes through two washers 38 and 39 and a bush 40 located in a hole 41 in the web 13. Two rubber supports 42 and 43 each having a pair of mutually parallel metal end plates bonded thereto are secured to a pair of faces of the block 36 meeting at a common edge and perpendicular to one another by screw-threaded engagement of respective screw-threaded pins 44 and 45 on end plates of the rubber supports 42 and 43 with the block 36. Further screw-threaded pins 46 and 47 on the other end plates of the rubber supports 42 and 43 enable the rubber supports to be secured to a bracket 48 which is bolted to the wall 33.

The mounting 35 is likewise constituted.

In operation the housing 32 is so mounted that the tubes 11 and 12 are preferably vertical, and therefore the bracket 21 must be sufficiently stiff for the axis of the drive coil 22 to pass substantially through the mid-points of the tubes 11 and 12 when the tubes 11 and 12 are vertical.

Referring again to FIG. 1, each end of each of the tubes 11 and 12 is welded to a respective collar 49 to which is bolted a respective port 50, the bores of the respective collars and ports being in register with the bores 17 and 18 of the tubes 11 and 12. The junctions between the ports 50 and the collars 49 are provided with respective sealing rings. The end walls 51 and 52 of the housing 32 have bolted to their outer surfaces Y-tubes 53 and 54 respectively and to their inner surfaces two further parts 55 respectively. The bores of the arms of each Y-tube and of the respective further ports 55 are in register with two apertures 56 in the respective end wall, the junctions of each arm and port with the respective end wall being provided with a sealing ring. The collars 49, the ports 50, the further ports 55, the end walls 51 and 52, and the Y-tubes 53 and 54 are formed of the same material as the tubes 11 and 12.

The bore of each further port 55 is in register with the bore of a respective port 50 and four rubber connecting tubes 57 are provided, each connecting a respective port 50 to the further port 55 coaxial therewith. The mouths of the connecting tubes 57 are clamped over ridged outer surfaces of the ports 50 and further ports 55 by worm-drive hose clips 58.

A platinum resistance thermometer 59 is mounted in the junction of the arms of the Y-tube 53, a further platinum resistance thermometer 60 being mounted similarly in the Y-tube 54. The probes 61 of the thermometers 59 and 60 are responsive to the temperatures of liquids passing, in operation, through the Y-tubes.

In operation, a liquid of which the density is to be determined enters the density meter through one of the Y-tubes 53 and 54 and leaves through the other Y-tube. Transverse vibration of the central portion 15 and 16 of the tubes 11 and 12 is initiated by either a slight mechanical vibration or by the occurrence of electrical noise in the circuitry associated with the assembly 19. These vibrations are maintained by feedback from the pick-up coils 23 and 24 through the maintaining amplifier 30 to the drive coil 22. The central portions 15 and 16 vibrate in anti-phase in a common plane, the central portions 15 and 16 bowing alternately towards and away from one another. The frequency of the fundamental transverse vibrations is dependent upon the density of the liquid flowing in operation through the tubes 11 and 12. An equation obtained theoretically for this frequency is $$f = \frac{3.57}{1^2} \sqrt{\frac{gEI}{W}} \quad (1)$$

where $f$ is the frequency of resonance in cycles per second, 1 is the length of each central portion 15 or 16 in inches,
$g = 32.2$ ft./sec.$^2$
E is Youngs modulus in lbs. wt./in.$^3$,
$I = \pi/64 \, (D^4 - d^4)$,
W is the mass per unit length of each central portion 15 or 16 in pounds per inch,
D is the external diameter of each central portion 15 or 16 in inches, and
d is the internal diameter of each central portion 15 or 16 in inches.

It can be shown from the Equation 1 that $$f = f_0 \sqrt{\frac{1}{1 + \frac{\rho L}{\rho o}}}$$

where $f_0$ and $\rho o$ are constants of the density meter and $\rho L$ is the density of the fluid in the tubes 11 and 12.

However, it has been found that it is necessary to substitute an effective value for 1 in the equation given in order to obtain results which are in agreement with experiment. The effective length is larger than 1. For example, where the length of each central portion of the tubes of an embodiment was 11.9 inches, the effective value was found to be 12.4 inches.

Referring to FIG. 4, the electrical connections of the drive coil 22 and the pick-up coils 23 and 24 to the bias current drive 29 and the maintaining amplifier 30 are shown. A D.C. source 70 mounted remotely from the density meter supplies power to the drive 29 and the amplifier 30.

The drive coil 22 is provided with a bias winding 62 to which current is supplied independently of the bias windings 63 and 64 of the pick-up coils 23 and 24 from a first bias circuit 65. A second bias current circuit 66 supplies current to the bias winding 63 and 64. It has been found necessary for the second bias circuit 66 to supply more current to the bias winding 63 than to the bias winding 64 in order to obtain substantially equal signals from the bias windings 63 and 64.

The pick up windings 67 and 68 of the pick-up coils 23 and 24 respectively are connected to the input circuit of the maintaining amplifier 30. The output circuit of the amplifier 30 is connected to the drive winding 69 of the drive coil 22 which is centre-tapped, the two halves of the winding 69 being driven in push-pull relationship by a long-tailed pair circuit of the output circuit of the maintaining amplifier 30. The maintaining amplifier 30 is a high-gain limiting amplifier and is supplied with input signals in push-pull relationship by the pick-up windings 67 and 68. The input circuit of the amplifier 30 introduces a phase advance which compensate for lag in the coupling of the drive coil 22 and pick-up coils 23 and 24 by means of the vibration of the central portions 15 and 16 of the tubes 11 and 12. In an embodiment constructed in accordance with FIG. 1, the phase advance required was 7°.

A voltage output is, in operation, supplied to a meter 71 from a voltage output circuit of the maintaining amplifier 30. The voltage output includes an alternating voltage the frequency of which is equal to the frequency of the transverse vibrations of the central portions 15 and 16. The meter 71 is a conventional frequency meter having an operative range covering the anticipated range of frequencies of the central portions 15 and 16 and is calibrated to read directly in density units. Alternatively, the meter 71 can take the form of an electronic counting circuit which is preceded by a gate controlled by means adapted to open the gate periodically for a fixed time interval, the content of the counting circuit being automatically set to zero before each opening of the gate. The counting circuit is adapted to control a display in such a manner that only the numbers stored in the counting circuit at the ends of the said time intervals are displayed. It will be realised that the display is calibrated to read directly in density units. Furthermore, a frequency meter including known means for altering the law of dependence of the indicated quantity upon the frequency of the voltage output from the maintaining amplifier 30 can be used for example, known means for obtaining an indicated quantity which is linearly related to $\rho o$, the density of the liquid in the tubes 11 and 12.

The temperature of the liquid entering the tubes 11 and 12 is measured, in operation, by means of one of the platinum resistance thermometers 59 and 60, the temperature of the liquid leaving the tubes 11 and 12 being measured by means of the other platinum resistance thermometer. The thermometers 59 and 60 are connected to conventional measuring apparatus (not shown) of which will be well known to those skilled in the art and is therefore not described further herein. The mean temperature of the liquid flowing through the tubes 11 and 12 can be calculated from the two temperatures sensed by the thermometers 59 and 60 thus enabling the value of the density of the liquid at a datum temperature to be calculated from that indicated by the density meter 71.

Direct magnetic coupling between the drive winding 69 and the pickup windings 67 and 68 is undesirable and it is for this reason that the assembly 19 and the manner of biasing by means of the bias windings 62, 63 and 64 shown in FIG. 1 is adopted. The magnetic polarities of the bias windings are so arranged as to render a direct coupling from the drive winding 69 to the pick-up winding 67 opposed to a direct coupling from the drive winding 69 to the pick-up winding 68. The magnetic shunts 25 and 26 screen the drive coil 22 from the pick-up coils 23 and 24 respectively.

The electrical connections of the biasing current drive 29 and the maintaining amplifier 30 to the D.C. source 61, of the amplifier 30 to the meter 71, and of the platinum resistance thermometers 59 and 60 to their associated measuring apparatus (not shown) are effected through a multicore screened cable 72 terminating in a plug connector 73 engaged in a socket connector (not shown) mounted in the end wall 52. For clarity, leads within the housing 32 are not shown. The platinum resistance thermometer 59 is provided with a cable 74 terminating in a plug connector 75 engaged in a socket connector 76 mounted in the end wall 51, the thermometer 60 being similarly provided for. The socket connectors of the plug connectors 75 are connected to the socket connector of the plug connector 73 by leads (not shown) within the housing 32.

An embodiment of the type shown in FIG. 1 having its tubes 11 and 12 of Ni-Span-C 902 was constructed. The internal diameters of the central portions 15 and 16 were $9/10$ inch, and the walls of the central portions were approximately $375/1000$ inch thick. The lengths of the central portions 15 and 16 were 11.9 inches. The density of Young's modulus of the tubes were $294/1000$ lb./cubic inch and $27 \times 10^6$ p.s.i. respectively. The central portions 15 and 16 were found to vibrate at 1050 c./s. when filled with water of density 1.000 gm./cc. and at 9976 c./s. when filled with glycerine of density 1.27 gm./cc. The working range of frequencies was found to be 800 c./s. to 1500 c./s.

Referring to FIG. 5 there is shown another liquid density meter embodying the present invention in which transverse vibration of the two non-magnetic stainless steel tubes 111 and 112 is maintained in operation. Two permanent magnets 113 and 114 are so arranged as to apply steady magnetic fields transversely through the tubes 111 and 112. A maintaining amplifier 126 is adapted to drive an electric current longitudinally through the tubes 111 and 112 in parallel. A lead 120 couples the maintaining amplifier 126 to two strain gauges, one of which is shown at 121, which are so mounted on the tubes 111 and 112 respectively as to be able to sense transverse vibration the central portions of the tubes 111 and 112 in a common plane.

The end portions of the tubes 111 and 112 are held securely in two metal blocks 118 and 119 which are connected to opposite ends of the secondary winding of an output transformer in the maintaining amplifier 126 by conductors 116 and 117 respectively. The block 118 includes inlet ports in the form of two nozzles 122 and 123 through which liquid can be supplied to fill the tubes 111 and 112 respectively. Two further nozzles (not shown) in the block 119 are provided as respective outlet ports of the tubes 111 and 112. Thus, the density of a liquid can be measured whether the liquid is stagnant or in flowing through the tubes 11 and 12.

In operation, the tubes 111 and 112 are filled with the liquid of which the density is to be measured and an electric current is driven through the tubes in parallel by the maintaining amplifier 126. Since the magnets 113 and 114 apply fields in opposite directions transversely through the tubes 111 and 112 whereas the electric current flows in the same direction along the tubes, the central portions of the tubes tend to move in opposite directions. Since the end portions of the tubes are fixed in the blocks 118 and 119 and the magnets are fixed in relation to the blocks the central portions of the tubes bend either bowing towards or away from one another. The bending of the central portions of the tubes is sensed by the strain gauges which in response generate a signal which is amplified by a preamplifier 124. The signal from the strain gauges is employed to modulate the current flowing through the tubes 111 and 112 both in amplitude and direction. Since this signal reaches its peak value when the tubes 111 and 112 are most bent, a phase-shifting network 125 is provided to couple the pre-amplifier 124 to the maintaining amplifier 126 and so shifts the phase of the signal from the strain gauges that the electric current flowing through the tubes 111 and 112 is at its peak value when the tubes are straight. Thus a substantially sinusoidal electric current having the same frequency as the frequency of transverse vibrations of the central portions of the tubes 111 and 112 but $\pi/2$ radians out of phase therewith is generated whereby transverse vibration of the tubes is maintained. Filters are included in the maintaining amplifier 126 to restrict the range of frequencies propagated therein as required.

In operation the tubes 111 and 112 are set into vibration either by a slight mechanical vibration or by the occurrence of electrical noise in the amplifier 126 as a result of "switching-on" the electrical apparatus 124, 125 and 126.

A frequency meter 71 is coupled to the maintaining amplifier 126 through a lead which in operation supplies to the meter 71 an electric signal having the same frequency as the electric current flowing through the tubes 111 and 112.

In a preferred embodiment which is similar to the embodiment shown in the figure, flats extending along substantially the entire length of the central portions are formed perpendicular to the common plane of vibration of the two tubes, that is the plane in which the axes of the tubes lie, whereby any tendency for the central portions of the tubes to vibrate in planes parallel to the magnetic fields is reduced. Furthermore, strain gauges for sensing vibrations are mounted on the flats. Alternatively tubes of elliptical or rectangular cross-section may be used. FIGURES 6, 7 and 8 show cross-sections of the central portions of tubes having respectively flats, elliptical cross-section and rectangular cross-section.

Other embodiments employing non-magnetic tubes can be constructed in which vibration-sensing means other than strain gauges are used. For instance optical, capacitive or inductive sensors can be used.

An advantage of non-magnetic tubes is the absence of magnetic hysteresis losses.

In FIGURE 9 there is shown an embodiment similar to that shown in FIGURE 1 but differing in that means are provided for at least partially compensating for the effect of the line pressure of a liquid flowing through the density meter. Parts of the density meter shown in FIGURE 1 which correspond to parts of the density meter of FIGURE 1 are indicated by reference numerals used in FIGURE 1.

The end portions of the tubes 11 and 12 uppermost in FIGURE 9 are connected by a U-shaped tube 77 formed of the same metal as the tubes, the ends of the bore of the tube 77 registering with the bores of the tubes 11 and 12 at the respective end portions. Liquid can enter the density meter through an inlet tube 78 and leave the density meter through an outlet tube 79, the liquid flowing in opposite directions through the tubes 11 and 12. Thus the U-shaped tube 77 comprises an outlet port for the tube 11 and an inlet port for the tube 12. A respective rubber pressure tube 57 connects each port 50 to a respective port 55 at the lower end wall 52 of the density meter housing 32.

The webs 13 and 14 are mounted on respective anti-vibration mountings (not shown) as described hereinbefore in connection with the embodiment shown in FIGURE 1. A threaded stud 80 is engaged in the web 14 and passes through the end wall 52. A nut 81 screw-threadedly engaged in the stud 80 cooperates with the stud in securing the portion of the lower end portions of the tubes 11 and 12 relative to the plane of the lower end wall 52.

When a liquid is passed through the density meter at a line pressure of, for example, 50 lb. wt. per square inch, the central portions 15 and 16 of the tubes 11 and 12 tend to distend in cross-section and consequently to decrease in length, and the liquid is compressed to some extent. However, the reaction of the liquid pressure against the U-shaped tube 77 tends to cause the central portions 15 and 16 to stretch. It can be shown that the decrease in length is proportional to $(P.d.(D+d))$ and the increase in length is proportional to $(P.d^2)$ where P is the line pressure of the liquid and D and d are the quantities referred to hereinbefore. Hence it is possible to determine a value of d empirically for which the increase and decrease are equal. With such a value of d the densitometer shown in FIGURE 9 is substantially insensitive to the line pressure of liquid flowing therethrough.

It will be understood that other embodiments in which fluid flows, in operation, through the tubes in succession can be constructed. For example, an embodiment substantially as described with reference to FIGURE 5 can include a U-shaped connecting tube connecting the pair of immediately adjacent nozzles at the block 119.

Each of the tubes 11 and 12 of the embodiment shown in FIGURES 1 and 9 can be formed by turning and boring operations from respective bars of square sections Ni-Span-C 902.

Alternatively, each tube can be formed from a tube having a cross-section corresponding to the required cross-section of the central portion of the tube 16 or 17, the end portions of the tube then being brought to the required size by flame deposition of Ni-Span-C 902 or other suitable metal.

Ni-Span-C 902 is an iron-nickel-chromium alloy produced by the Huntington Alloy Products Division of the International Nickel Company, Incorporated, of Huntington, West Virginia, and has the following limiting chemical composition:

| | | |
|---|---|---|
| Nickel (plus cobalt) | percent | 41.0–43.50 |
| Chromium | do | 4.90–5.75 |
| Titanium | do | 2.20–2.75 |
| Aluminium | do | 0.30–0.80 |
| Carbon | maximum percent | 0.06 |
| Manganese | do | 0.08 |
| Silicon | do | 1.00 |
| Sulphur | do | 0.04 |
| Phosphorus | do | 0.04 |
| Iron | | Remainder |

Further details of the properties of Ni-Span-C 902 are given in Technical Bulletin T–31 of the Huntington Alloy Products Division.

For some applications where the tubes 11 and 12 are of Ni-Span-C 902 it may be desirable to improve the resistance of the density meter to corrosion by coating the bores of the tubes with a thin layer of polytetrafluoroethylene.

In some applications where the rubber connecting tubes 57 would be inconvenient or undesirable, stainless steel bellows may be used.

Other embodiments of the invention can be constructed in which natural transverse vibrations of the central portions of the tubes are excited by means for applying an impulse to each central portion, the vibrations being then allowed to decay and the frequency of the vibrations being measured during their decaying.

What is claimed is:

1. A fluid density meter for measuring the density of a fluid, comprising
   two tubes formed of the same resilient material and having uniform bores, the respective central portions of said tubes having identical dimensions;
       means securing each end portion of each of said tubes to a respective end portion of the other of said tubes, said central portions being spaced apart;
       fluid inlet and outlet ports serving said bores, a respective inlet port and a respective outlet port being located at opposite ends of each tube;
       means for exciting respective natural transverse vibrations of said central portions in anti-phase when said tubes are full of a fluid; and
       means for providing a signal representative of the frequency of said vibrations.

2. A density meter as claimed in claim 1, wherein the second and third said means are electrical.

3. A density meter as claimed in claim 2 wherein said resilient material is ferromagnetic, said second means including a drive coil so arranged as to supply kinetic energy magnetically to said central portion of said tubes, and said third means includes at least one pick-up coil so arranged as to sense said vibrations.

4. A density meter as claimed in claim 3, wherein the axis of said drive coil passes through the mid-points of said central portions of said tubes and there are two pick-up coils, the axes of said pick-up coils being equidistant from and parallel to the axis of said drive coil and lying in the plane containing the axes of said tubes.

5. A density meter as claimed in claim 4, wherein two magnetic shunts are disposed symmetrically about the axis of said drive coil in said plane, each shunt lying between said drive coil and a respective one of said pick-up coils.

6. A density meter as claimed in claim 4, wherein said pick-up coils include respective bias windings for establishing cooperating steady magnetic fields.

7. A density meter as claimed in claim 3, wherein said means securing said end portions support said drive coil and said pick-up coil.

8. A density meter as claimed in claim 3, wherein said resilient material is Ni–Span–C 902 or Elinvar.

9. A density meter as claimed in claim 1, wherein the walls of each said tube at said end portions thereof have a greater thickness than the tube walls located centrally of said tube.

10. A density meter as claimed in claim 5, wherein said means securing said end portions support said drive coil and said pick-up coils, said pick-up coils including respective bias windings for establishing steady magnetic fields forming a magnetic circuit which links said pick-up coils.

11. A density meter as claimed in claim 1, wherein said fluid inlet ports are immediately adjacent and said fluid outlet ports are immediately adjacent, and including a first Y-tube of which the arms are connected respectively to said fluid inlet ports, and a second Y-tube of which the arms are connected respectively to said fluid outlet ports.

12. A density meter as claimed in claim 11, including a first temperature sensitive element so mounted in said first Y-tube as to sense the first temperature of fluid entering said tube and responsive to said temperature to generate a first temperature signal representative of said first temperature, and a second temperature sensitive element so mounted in said second Y-tube as to sense the second temperature of fluid leaving said tubes and responsive to said second temperature to generate a second temperature signal representative of said second temperature.

13. A fluid density meter for measuring the density of a fluid, comprising
two tubes formed of a resilient ferromagnetic metal and having uniform bores, the respective central portions of said tubes having identical dimensions;
two webs of said metal so securing said tubes that each end portion of each of said tubes is secured to a respective end portion of the other of said tubes by a respective one of said webs and said central portions are spaced apart;
respective fluid inlet ports to said bores;
a first Y-tube of which the arms are connected respectively to said fluid inlet ports;
respective fluid outlet ports from said bores;
a second Y-tube of which the arms are connected respectively to said fluid outlet ports;
a drive coil arranged with its axis passing through the mid-points of said central portions;
two pick-up coils, so arranged that their axes are equidistant from and parallel to said axis of said drive coil and lie in the plane containing the axes of said tubes and having respective bias windings for establishing cooperating steady magnetic fields;
two magnetic shunts disposed symmetrically about said axis of said drive coil in said plane, each shunt lying between said drive coil and a respective one of said pick-up coils;
mounting means on which said drive coil, said pick-up coils, and said shunts are mounted, the mounting means being secured to and supported by said webs; and
amplifying means so coupling said pick-up coils to said drive coil that, in operation when said tubes are full of a fluid, respective natural transverse vibrations of said central portions are maintained by feedback from said pick-up coils to said drive coil, and including output means for providing a signal representative of the frequency of said vibrations.

14. A fluid density meter as claimed in claim 1, including conduit means connecting a pair of immediately adjacent ones of said ports, fluid flowing, in operation, from one of said tubes to the other of said tubes by way of said conduit means.

15. A fluid density meter as claimed in claim 14, wherein said pair of ports and said conduit means are formed integral with one another.

16. A fluid density meter for measuring the density of a fluid comprising
two tubes formed of a resilient ferromagnetic metal and having uniform bores, the respective central portions of said tubes having identical dimensions;
two webs of said metal so securing said tubes that each end portion of each of said tubes is secured to a respective end portion of the other of said tubes by a respective one of said webs and said central portions are spaced apart;
respective inlet and outlet ports to said bores immediately adjacent one of said webs;
a U-shaped connecting tube formed of said metal secured to said tubes and connecting said bores at the ends thereof immediately adjacent the other of said webs;
a drive coil arranged with its axis passing through the midpoints of said central portions;
two pick-up coils, so arranged that their axes are equidistant from and parallel to said axis of said drive coil and lie in the plane containing the axes of said tubes and having respective bias windings for establishing cooperating steady magnetic fields;
two magnetic shunts disposed symmetrically about said axis of said drive coil in said plane, each shunt lying between said drive coil and a respective one of said pick-up coils;
mounting means on which said drive coil, said pick-up coils, and said shunts are mounted, the mounting means being secured to and supported by said webs; and
amplifying means so coupling said pick-up coils to said drive coil that, in operation when said tubes are full of a fluid, respective natural transverse vibrations of said central portions are maintained by feedback from said pick-up coils to said drive coil, and including output means for providing a signal representative of the frequency of said vibrations.

17. A density meter for measuring the density of a fluid comprising
two tubes formed of electrically conductive non-magnetic resilient material and having uniform bores, the respective central portions of said tubes having identical dimensions;
means securing each end portions of each of said tubes to a respective end portion of the other of said tubes, and central portions being spaced apart;
fluid inlet and outlet ports to said bores, the respective inlet and outlet ports of each bore being located at opposite ends of the respective tube;
electric amplifying means electrically connected to said tubes, so as, in operation, to pass electric currents therethrough;
magnetic means so arranged as to apply, in operation, steady magnetic fields transversely through said central portions in such directions relative to said currents that said central portions are subject to respective electrodynamic forces in mutually opposite directions in the plane containing the axes of said tubes;
vibration sensing means for sensing respective transverse vibrations of said central portions in said plane and generating in response to said vibrations an electric signal representative of the frequency of said vibrations;
further electric means so coupling said vibration sensing means to said amplifying means that, in operation, natural transverse vibrations of said central portions in said plane are maintained when said tubes are full of water; and
means for providing an electric output signal representative of the frequency of said natural transverse vibrations.

18. A density meter as claimed in claim 17, wherein said tubes are electrically connected in parallel with one another, said magnetic fields acting in opposite directions.

19. A density meter as claimed in claim 1, wherein the cross-sections of said central portions are elliptical, the major dimension of each said cross-section being perpendicular to said plane.

20. A density meter as claimed in claim 1, wherein the cross-sections of said central portions are rectangular, the major dimensions of each said cross-section being perpendicular to said plane.

21. A density meter as claimed in claim 1, wherein at least one flat is formed externally on each said central portion, said flat extending along substantially the entire length of said central portion and lying in a plane perpendicular to said plane, the cross-section of each said central portion being substantially circular.

References Cited

UNITED STATES PATENTS 2,943,476  7/1960  Bernstein _____ 73—32

FOREIGN PATENTS 1,287,559  2/1962  France.
920,100  3/1963  Great Britain.
159,678  1/1964  U.S.S.R.

JAMES J. GILL, *Primary Examiner.*

JOHN K. LUNSFORD, *Assistant Examiner.*